Dec. 29, 1925.
K. DAVIS
1,567,319
INDUCTION MOTOR
Filed Nov. 22, 1920   3 Sheets-Sheet 1
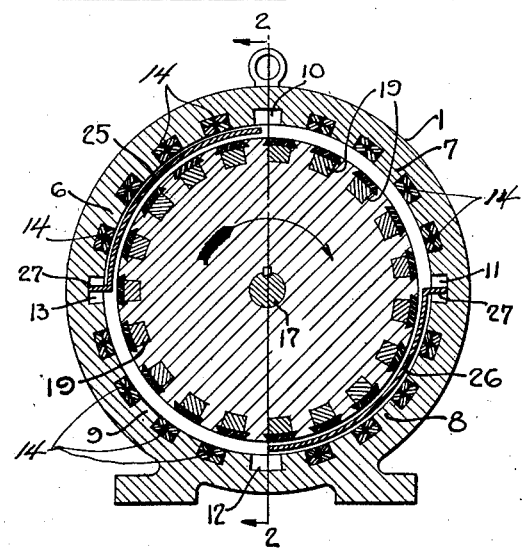
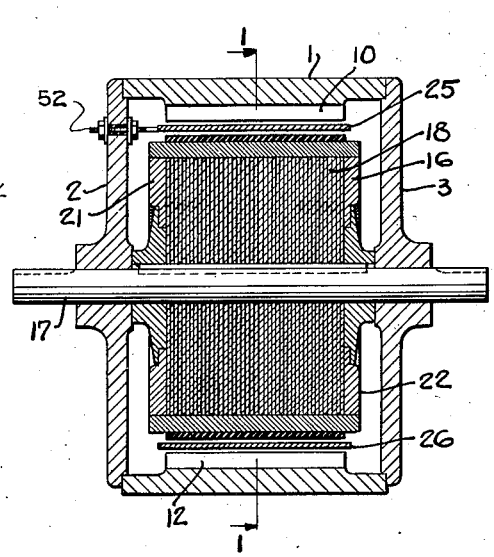
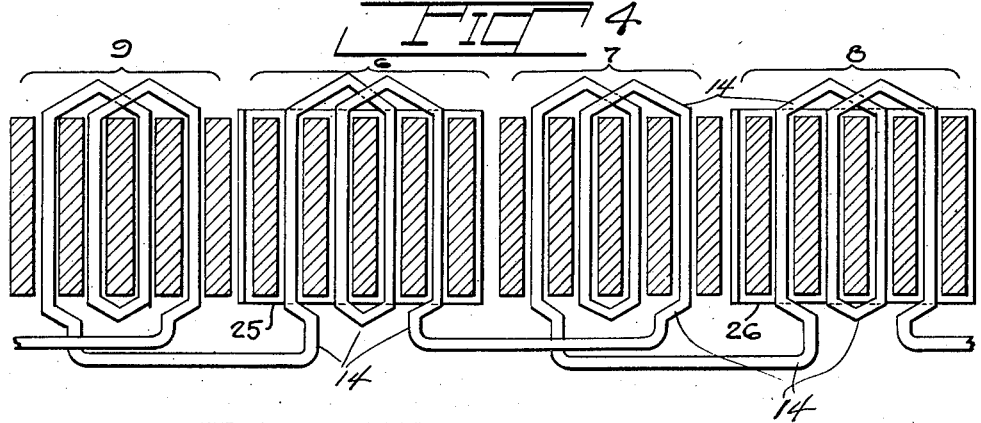
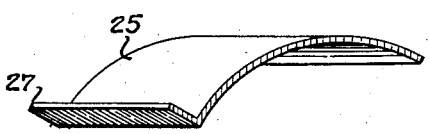
Inventor
Kenneth Davis
By John D. Morgan
Attorney

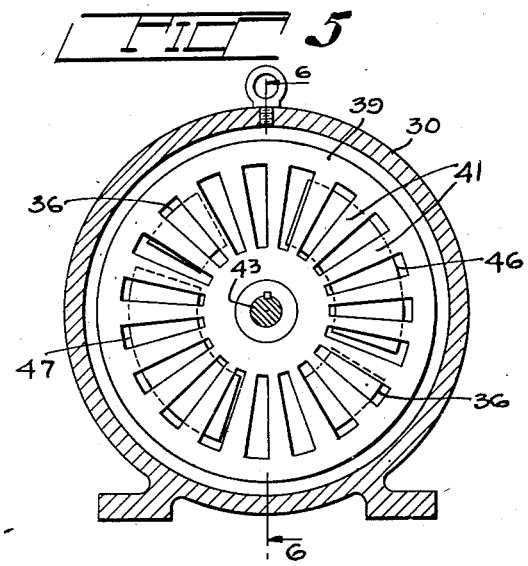
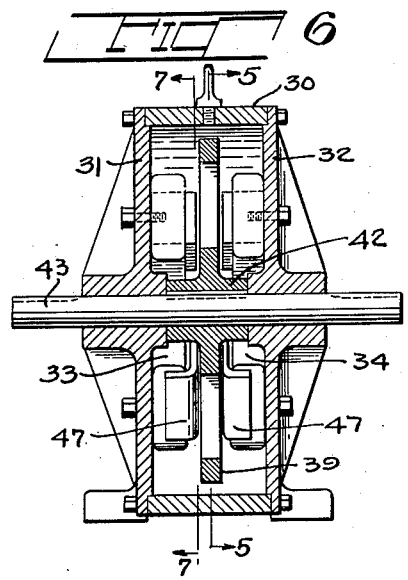
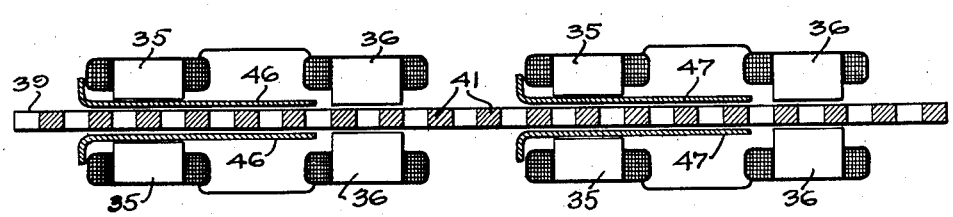
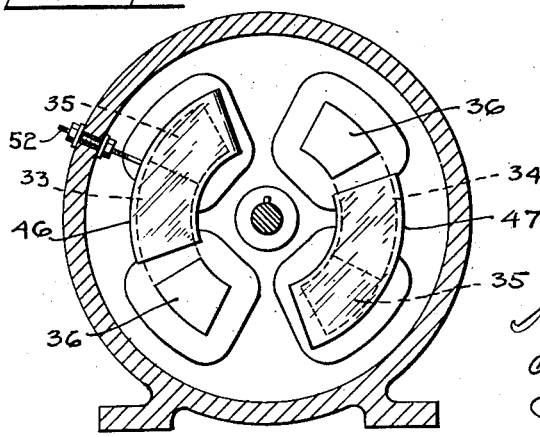

Dec. 29, 1925.

K. DAVIS 1,567,319

INDUCTION MOTOR

Filed Nov. 22, 1920

INVENTOR
Kenneth Davis
BY John D Morgan
ATTORNEY.

Patented Dec. 29, 1925.

1,567,319

UNITED STATES PATENT OFFICE.

KENNETH DAVIS, OF ST. BENEDICT, PENNSYLVANIA, ASSIGNOR TO REMBRANDT PEALE, OF NEW YORK, N. Y.

INDUCTION MOTOR.

Application filed November 22, 1920. Serial No. 425,841.

*To all whom it may concern:*

Be it known that I, KENNETH DAVIS, a citizen of the United States, residing at St. Benedict, in the county of Cambria and State of Pennsylvania, have made certain new and useful Improvements in Induction Motors, of which the following is a specification.

The invention relates to induction motors, and more especially to such motors which are self starting and have a constant or continuous torque.

The present invention is directed to novel and useful improvements in induction motors, and in certain features thereof is directed more especially to provide such a motor which is self-starting, is of simple construction as well as possessing other advantages.

The invention consists in the novel parts, constructions, arrangements, combinations and improvements herein shown and described.

The accompanying drawings, which are somewhat diagrammatic in character, illustrate an embodiment of the invention, in two somewhat different forms, and together with the description they serve to illustrate the principles of the invention.

Of the drawings:—

Fig. 1 is a vertical section of a motor embodying the invention taken on line 1—1 of Fig. 2;

Fig. 2 is a vertical section taken on the line 2—2 of Fig. 1;

Fig. 3 is a detached detail of the shield shown in Figs. 1 and 2;

Fig. 4 is a diagrammatic development of the stator field of Figs. 1 and 2;

Fig. 5 is a section of a motor having a disc rotor taken on the line 5—5 of Fig. 6;

Fig. 6 is a section taken on lines 6—6 of Fig. 5;

Fig. 7 is a section taken on line 7—7 of Fig. 6; and

Fig. 8 is a diagrammatic development of the stator field and of the rotor shown in Figs. 5, 6 and 7.

Figure 9:
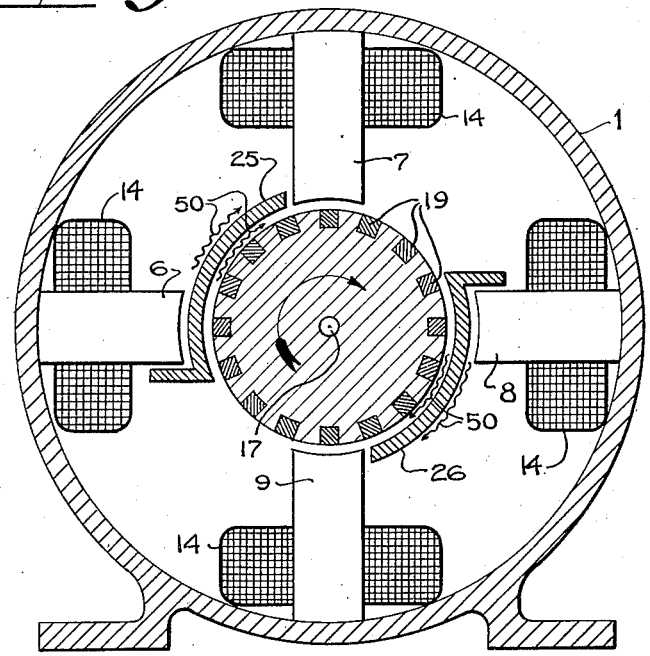
Fig. 9 is a diagrammatic sectional elevation of a motor such as is shown in Figs. 1 to 5, and indicating the resultant of the action of the eddy currents in the torque plates.

The invention as embodied in an exemplary manner in the accompanying drawings, is applied to a single phase induction motor which is self-starting and which has a constant or continuous torque, and in Figs. 1 to 4 a form of motor is shown having an external stator field and a drum rotor mounted on a central shaft. In Figs. 5 to 8 a form of motor is shown having a disc rotor mounted on the shaft with the field arranged on both sides thereof.

The invention provides means for annulling or neutralizing the repelling action of the field upon the armature or rotor windings or circuits entering the field, and substituting therefor an accelerating or propulsive force in the direction of rotation of the rotor. In accordance with one feature of the invention, in effecting this, means are provided for creating countervailing eddy currents in the gap between the stator and rotor neutralizing that portion of the field which otherwise would resist the entrance of the rotor windings into the field, which currents also exert a propulsive force upon the rotor in the direction of its rotation.

More in detail and as embodied, means, such as a metal plate, are inserted in the field in the gap between the stator and rotor there being set up in the plate countervailing eddy currents, which neutralize the repelling action of the field upon the rotor, and which also exert a positive attraction or rotative force in the direction of rotation of the rotor, whereby the stator field is caused to exert a continuous uni-directional torque upon the rotor, and whereby the motor is also rendered self-starting. That is, by the invention not only is the repelling action of the first half of the field neutralized, but the rotor windings as they enter the field are drawn thereinto.

Referring now in detail to the present exemplary embodiment as illustrated in Figs. 1 to 4, a frame or casing 1 is shown of general cylindrical form and having end plates 2 and 3, which may have suitable ventilating openings and be otherwise formed to meet all practical requirements.

In the embodiment of said figures, a stationary field is shown comprising pole pieces 6, 7, 8 and 9, with gaps 10, 11, 12 and 13, interposed therebetween, respectively. The windings for the poles are indicated by 14, and a diagram of one form of winding for the field magnets is shown in the development of Fig. 4.

The rotor or armature 16 is cylindrical in form and is mounted on a shaft 17 journaled in the end plates 2 and 3 of the motor casing. The body of the rotor 16 is preferably composed of laminated plates 18 keyed on shaft 17. In the periphery of the rotor are mounted longitudinally disposed, parallelly spaced apart copper rods or bars 19, preferably provided with covering strips 20 of insulating material. The bars 19 are connected together at their ends by annular plates 21 and 22 of copper or other conducting metal, that is, this may constitute essentially, what is usually known as a squirrel cage winding, all the bars being electrically connected together at both ends by the rings or other suitable connections.

The embodied form of means for neutralizing the repulsion or resistance of the field to the entry thereinto of the rotor circuits and for additionally exerting a propulsive force on the rotor in the direction of its rotation, comprises arcuate plates 25 and 26, interposed in the gap between the magnets and the rotor, the plates being preferably of aluminum or other non-magnetic metal. The plates I call for convenience torque plates.

Each of the plates is preferably of greater area than one of the poles of the field magnets and covers the entire pole in the sense that it is interposed between the entire face of the pole and the rotor. The plate 25 or 26 also preferably extends from the so covered pole towards and into close proximity to the next adjacent pole of the same or of opposite sign. In Figs. 1 and 4 the plates 25 and 26 are shown extending past the respective covered poles and are each provided with a turned up or bent edge 27 extending into the gap between the two adjacent poles, such turned up edges constituting a shield between the two poles.

In Figs. 5 to 8 the motor is shown with a rotor of disc form and with the remaining parts adapted to this type of machine. The casing is shown of general cylindrical form with a shell 30 and end plates 31 and 32, and may have ventilating openings and be otherwise adapted for practical conditions.

The field magnets 33 and 34 as shown are of arcuate form and are mounted in pairs upon each of the end plates 31 and 32, respectively, and each magnet has pole pieces 35 and 36, respectively. The rotor is a disc 39 having radially disposed slots 40 formed therein, thereby dividing the disc into radially disposed bars 41 in the region of the field. Disc 39 has its hub 42 keyed on shaft 43, which shaft is journaled in the end plates 31 and 32.

The means for neutralizing the repulsion or resistance of the field to the entrance thereinto of the successive bars 41 of the rotor, and for exerting upon the rotor an additional rotative force in the direction of its rotation, as already described, comprises arcuate plates 46 and 47, preferably but not necessarily of non-magnetic metal, such as aluminum, which are in pairs on either side of the disc rotor 39. The plates 46 and 47 are of flat and arcuate form and are preferably of sufficient area to cover the corresponding pole pieces in the sense already mentioned of being interposed between the entire area of the particular pole face and the disc rotor 39.

The plates 46 and 47 are also preferably of greater area than the pole face and extend into close proximity to the next adjacent pole of the same or opposite sign and preferably have a bent or turned up portion extending into the gap between the poles and closely adjacent to said pole, these bent up edges acting as a shield between the poles.

The shield or plate placed over or covering a pole face as described serves to deflect the lines of force of the field and there are eddy currents thereby created or set up in the shield or plate. These eddy currents are opposite in direction to the portion of the field which resists the entrance of the non-current carrying circuit elements or coils of the rotor, and thus they neutralize or overcome the resistance to the rotation of the rotor in the desired direction. As already stated also, the eddy currents act to impose on the rotor a rotative force in the direction of its rotation. Thus the rotor is subjected to a continuous torque in the desired direction and likewise is self-starting.

The area and thickness of the torque plates affect their action, and as at present advised, I prefer to construct them of as great thickness as is found practicable consistent with a gap of greatest of efficiency between the pole pieces and the rotor. This I have found in practice increases the torque. The same result also is effected by likewise making the torque plates of relatively large area, that is, by having the plates of somewhat greater width than the covered pole piece and also having them extend lengthwise beyond the poles and into close proximity to the next adjacent pole on one side of the plate.

Figure 10:
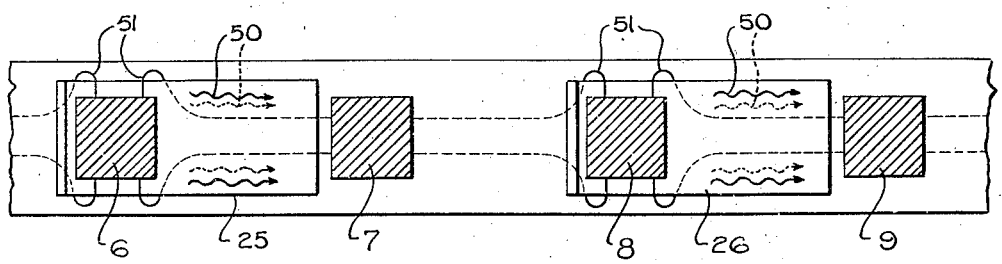
Fig. 10 is a diagrammatic development of a part of Fig. 9, and indicating the action of the eddy currents and the modification of the field by the torque plates.

Figs. 9 and 10 are also diagrammatic and are intended to illustrate the action of the eddy currents in the torque plates, the rotative effect of the eddy currents being indicated by the arrows 50. The plates act also to diffuse or to weaken the field where the repellant action upon the rotor would be exerted, as indicated by the arrows 51.

The torque effecting action of the plates can be controlled or modified by moving them with relation to their respective poles. In Figs. 2 and 7 an insulated bolt and nut adjustment 52 is shown for this purpose. By this means the plates can be partially withdrawn from over the faces of the respective pole pieces or moved in the opposite direction, as desired, thereby decreasing or increasing the torque effecting action of the plate.

By the invention, an alternating current induction motor is provided, which may be either single phase or polyphase, having all the desirable characteristics of a direct current motor, but which will not run beyond a predetermined high speed which is determined or fixed by the design of the motor. Such a motor will start under load, and will slow down and pick up speed with variations in the load, while maintaining a continuous torque. The motor has many applications, and one of its special adaptations is for locomotive and other traction work, such as mine locomotives under current supplying conditions which are most practical and economical in connection with mine work.

The statement of the theory or principle of operation is correct to the best of my present knowledge, gained by observation and experiment, but I do not wish the invention to be unnecessarily or harmfully limited or affected thereby.

The invention in its broadest aspect is not limited to the specific mechanisms shown and described but departures may be made therefrom within the scope of the accompanying claims without departing from the principles of the invention and without sacrificing its chief advantages.

What I claim is:—

1. An induction motor including in combination an inducing member with definite poles, a rotor having induced current carrying circuits, and a metal plate interposed in the gap between a pole piece and the rotor and covering the entire pole piece.

2. An induction motor including in combination an inducing member with definite poles, a rotor having induced current carrying circuits, and a metal plate interposed in the gap between a pole piece and the rotor and covering the entire pole piece, and extending beyond the pole and into proximity to the next adjacent pole piece.

3. An induction motor including in combination an inducing member with definite poles, a rotor having induced current carrying circuits, and a non-magnetic metal plate interposed in the gap between a pole piece and the rotor and covering the entire pole piece, the plate being at least equal in area to the pole piece.

4. An induction motor including in combination an inducing member with definite poles, a rotor having induced current carrying circuits, and a non-magnetic metal plate interposed in the gap between a pole piece and the rotor and covering the entire pole piece, and extending beyond the pole and into proximity to the next adjacent pole piece.

5. An induction motor including in combination an inducing member with definite poles, a rotor having induced current carrying circuits, and a metal plate interposed in the gap between a pole piece and the rotor and covering the entire pole piece, and also extending between said pole piece and an adjacent pole piece of opposite sign.

6. An induction motor including in combination an inducing member with definite poles, a rotor having induced current carrying circuits, and a metal plate interposed in the gap between a pole piece and the rotor and covering the entire pole piece, and extending beyond the pole and into proximity to the next adjacent pole piece, and also extending between said pole piece and an adjacent pole piece.

7. An induction motor including in combination an inducing member with definite poles, a rotor having induced current carrying circuits, and a non-magnetic metal plate interposed in the gap between a pole piece and the rotor and covering the entire pole piece, and also extending between said pole piece and an adjacent pole piece.

8. An induction motor including in combination an inducing member with definite poles, a rotor having induced current carrying circuits, and a non-magnetic metal plate interposed in the gap between a pole piece and the rotor and covering the entire pole piece, and extending beyond the pole and into proximity to the next adjacent pole piece, and also extending between said pole piece and an adjacent pole piece.

9. An induction motor including in combination an inducing member with definite poles, a rotor having induced current carrying circuits, and a metal plate interposed in the gap between a pole piece and the rotor and covering the entire pole piece, and means for regulating the relative position of the plate and pole piece.

10. An induction motor including in combination an inducing member with definite poles, a rotor having induced current carrying circuits, and a metal plate interposed in the gap between a pole piece and the rotor and covering the entire pole piece, and extending beyond the pole and into proximity to the next adjacent pole piece, and means for regulating the relative position of the plate and pole piece.

11. An induction motor including in combination an inducing member with definite poles, a rotor having induced current carrying circuits, and a metal plate interposed in the gap between a pole piece and the rotor and covering the entire pole piece, and means for moving the plate transversely relatively to the pole piece.

12. An induction motor including in combination an inducing member with definite poles, a rotor having induced current carrying circuits, and a metal plate interposed in the gap between a pole piece and the rotor and covering the entire pole piece, and extending beyond the pole and into proximity to the next adjacent pole piece, and means for moving the plate transversely relatively to the pole piece.

In testimony whereof, I have signed my name to this specification.

KENNETH DAVIS.